(12) United States Patent
Lakkundi et al.

(10) Patent No.: US 12,050,708 B2
(45) Date of Patent: Jul. 30, 2024

(54) CARDINAL METHOD FOR HIERARCHICAL PHASED SECURE ACCESS TO SYSTEM ENTITIES IN ISOLATED MULTI-TENANT DATABASE FOR AUTONOMOUS CLOUD ENVIRONMENTS

(71) Applicant: Oracle International Corporation, Redwood Shores, CA (US)

(72) Inventors: Vijayendra Rao Lakkundi, Telengana (IN); Nagarajan Muthukrishnan, Foster City, CA (US); Ravi Shankar Thammaiah, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 275 days.

(21) Appl. No.: 17/692,709

(22) Filed: Mar. 11, 2022

(65) Prior Publication Data
US 2023/0289459 A1    Sep. 14, 2023

(51) Int. Cl.
*G06F 21/62*    (2013.01)
*H04L 9/40*    (2022.01)

(52) U.S. Cl.
CPC ........ *G06F 21/6218* (2013.01); *H04L 63/102* (2013.01)

(58) Field of Classification Search
CPC .. G06F 21/6218; G06F 16/211; G06F 16/252; G06F 16/27; G06F 16/284; H04L 63/102
See application file for complete search history.

(56) References Cited

U.S. PATENT DOCUMENTS

| 8,966,464 B1 | 2/2015 | Keian et al. |
| 10,733,316 B2 * | 8/2020 | Shanthaveerappa .... G06F 16/21 |
| 10,942,945 B2 * | 3/2021 | Shilimkar ............. G06F 16/284 |

(Continued)

OTHER PUBLICATIONS

Sirohi et al., "Context-sensitive Indexes in RDBMS for Performance Optimization of SQL Queries in Multi-tenant/Multi-application Environments", In Proceedings of the 17th International Conference on Enterprise Information Systems, 2015, 12 pages.

(Continued)

*Primary Examiner* — Eric W Shepperd
(74) *Attorney, Agent, or Firm* — Hickman Becker Bingham Ledesma LLP; Brian Miller

(57) ABSTRACT

Herein are multitenant database security techniques for fine-grained and dynamic access control of protected resources according to phases and roles. In an embodiment, a computer associates a process with a particular pluggable database of many pluggable databases in a container database in a database management system (DBMS). From the process, a request is received to access a protected resource that the particular pluggable database does not contain. Based on the protected resource and the particular pluggable database, the DBMS dynamically decides, in response to receiving the request, whether to permit access to the protected resource. Based on authorization by the DBMS, the protected resource is accessed to fulfil the request. In an embodiment, centrally managed policy decisions for restricted access are dynamically employed across a fleet of databases through a global policy manager.

20 Claims, 5 Drawing Sheets

(56) References Cited

U.S. PATENT DOCUMENTS

| | | |
|---|---|---|
| 2010/0138639 A1 | 6/2010 | Shah |
| 2011/0307544 A1 | 12/2011 | Lotlikar |
| 2014/0095546 A1 | 4/2014 | Kruglikov |
| 2014/0096134 A1 | 4/2014 | Barak et al. |
| 2014/0330869 A1 | 11/2014 | Factor et al. |
| 2015/0254240 A1* | 9/2015 | Li ........................... G06F 16/27 707/703 |
| 2015/0256526 A1 | 9/2015 | Biegala |
| 2015/0373004 A1* | 12/2015 | Hopkins ............... G06F 16/278 726/6 |
| 2016/0085963 A1 | 3/2016 | Birnbaum |
| 2017/0111365 A1* | 4/2017 | Michael .................. G06F 9/545 |
| 2017/0116041 A1 | 4/2017 | Nanjundaswamy |
| 2017/0116335 A1* | 4/2017 | Baby ........................ G06F 8/65 |
| 2017/0177625 A1* | 6/2017 | Lam ..................... G06F 16/213 |
| 2017/0272475 A1 | 9/2017 | Yu et al. |
| 2017/0323112 A1* | 11/2017 | Tran ..................... G06F 16/258 |
| 2018/0039678 A1* | 2/2018 | De Lavarene .... G06F 16/24552 |
| 2018/0046820 A1* | 2/2018 | De Lavarene .......... H04L 63/02 |
| 2018/0048718 A1* | 2/2018 | De Lavarene ........ H04L 67/141 |
| 2019/0007895 A1* | 1/2019 | Bregler ................... G06F 9/445 |
| 2019/0102384 A1* | 4/2019 | Hung ................... G06F 9/4843 |
| 2020/0117743 A1* | 4/2020 | Shilimkar ........... G06F 9/45558 |
| 2020/0125413 A1 | 4/2020 | Thammaiah |
| 2020/0125652 A1 | 4/2020 | Shilimkar |
| 2022/0245032 A1* | 8/2022 | Singh ................... G06F 16/275 |

OTHER PUBLICATIONS

Le Sommer et al., "A Contract-Based Approach of Resource-Constrained Software Deployment", 12th European Conference on Computer Vision, ECCV, dated Jan. 1, 2002, 16 pages.

Jessie Frazelle: "Jessie Frazelle's Blog: Hard Multi-Tenancy in Kubernetes", dated May 18, 2018, 10 pages.

Hingwe et al., "Hierarchical Role-Based Access Control with Homomorphic Encryption for Database as a Service", 2016, 11 pages.

* cited by examiner

CARDINAL METHOD FOR HIERARCHICAL PHASED SECURE ACCESS TO SYSTEM ENTITIES IN ISOLATED MULTI-TENANT DATABASE FOR AUTONOMOUS CLOUD ENVIRONMENTS

RELATED CASE

Incorporated in its entirety herein is related U.S. Pat. No. 10,942,945 "Isolated Hierarchical Runtime Environments for Multi-Tenant Databases" filed Oct. 19, 2018 by Santosh Shilimkar et al.

FIELD OF THE DISCLOSURE

This disclosure relates to multitenant database security. Presented herein are techniques for fine-grained and dynamic access control of protected resources according to phases and roles.

BACKGROUND

A container database management system (DBMS) is a powerful mechanism for database consolidation. A container DBMS provides a high degree of computer resource sharing while concurrently providing a high degree of isolation. A container DBMS is based on a "container". A container is a collection of schemas, objects, and related structures in a multitenant container database (CDB) that appears logically to an application as a separate database. Within a CDB, each container has a unique identifier and name. The root database and every pluggable database (PDB) is considered a container. A container DBMS may contain numerous PDBs. PDBs isolate data and operations so that from the perspective of a user or application, each PDB appears as if it were a traditional non-CDB. Each PDB is defined by its own separate database dictionary, defining database objects within the PDB. A user may access a PDB within a container DBMS by establishing a database session for a PDB. Techniques and mechanisms of a multitenant database architecture composed of a CDB, root database, PDBs, database dictionaries, and database sessions are presented later herein, with their arrangement and internals depicted in related U.S. Pat. No. 10,942,945.

The container DBMS stores the system metadata required to manage all PDBs within the container DBMS. In some implementations, the root database of a container DBMS stores data that is common across the PDBs of the container DBMS, such as definitions for common users and roles, shared tables, code packages, and so forth. A PDB comprises a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared database resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

A CDB enables amortization of computer resources such as operating system resources. Operating system resources may be accessed and managed by an operating system. Operating system resources include processes, memory, network resources, filesystems, subdirectories therein, and central processing units (CPUs). The computer resources required to provision and host a PDB are in effect amortized between the multiple PDBs within a CDB. The computer resources needed per PDB are thereby reduced. In a container DBMS, database server system processes are not dedicated on a per PDB basis, but rather serve multiple PDBs within a CDB. The overhead of database server system processes is thereby amortized across the multiple PDBs in the CDB.

A container DBMS provides isolation, at least to a degree. Database sessions established for a PDB may be limited to accessing or otherwise viewing database objects defined for the PDB by the PDBs dedicated database dictionary. A container DBMS may implement various levels of isolation. While database objects may be isolated between database sessions of PDBs, various computing resources may be shared across database sessions of PDBs. Hosting multiple PDBs on the same database server thus allows the computing resources of database servers or instances to be shared between multiple PDBs.

Using a multitenant architecture, a server within a single operating system instance is used to run multiple CDBs and PDBs. By using a single operating system instance, resources managed by the operating system may be shared, including computing resources, filesystems, and network resources. However, sharing such resources between multiple tenants exposes vulnerabilities to malicious tenants. Processes belonging to one tenant can potentially access other tenant database processes, tamper with other tenants' resources, and interfere with execution. Described herein are techniques for isolating runtime environments in a multitenant container DBMS.

In a static security regime, database service processes of each pluggable database are statically (i.e. not evolving) authorized to access a respective set of computer resources for the pluggable database. The database sessions of a pluggable database may access the resources of the pluggable database but cannot access resources of another pluggable database. In this way, operating system resources of a tenant of a pluggable database are isolated from operating system computer resources of other tenants of other pluggable databases. The database service processes of each container DBMS are also isolated.

In autonomous cloud environments, hundreds or thousands of tenant databases can be consolidated as pluggable databases in isolated container databases that are hosted in compute appliances. These multitenant environments provide execution environments for thousands of clients within the consolidated databases. Providing secure access to tenant database entities in a hierarchical manner while isolating and preventing those entities from accessing higher level privileged resources is a vital requirement for any cloud management framework that includes consolidated databases and cloud appliances.

Throughout their lifetime, tenant database runtime entities such as processes or threads are continually interacting with underlying privileged resources such as the operating system for various services and activities. Based on execution characteristics and a database containment hierarchy, different sets of access methods in various levels should be permitted in a secured and hierarchical manner. These privileged interactions are potential targets for exploitation because they expose the higher level elements to intruders when not properly protected.

Unauthorized actors such as humans, viruses, malware, worms, and other automated malicious programs might exploit these privileged interactions through vulnerabilities to cause a security breach. In multitenant environments, gaining access to one tenant database can potentially expose other tenant databases, higher level containers, and even the underlying hosting infrastructure. Current techniques are not advanced enough to dynamically address the problem in a flexible way as needed for an evolving multitenant runtime environment.

DETAILED DESCRIPTION

Figure 1:
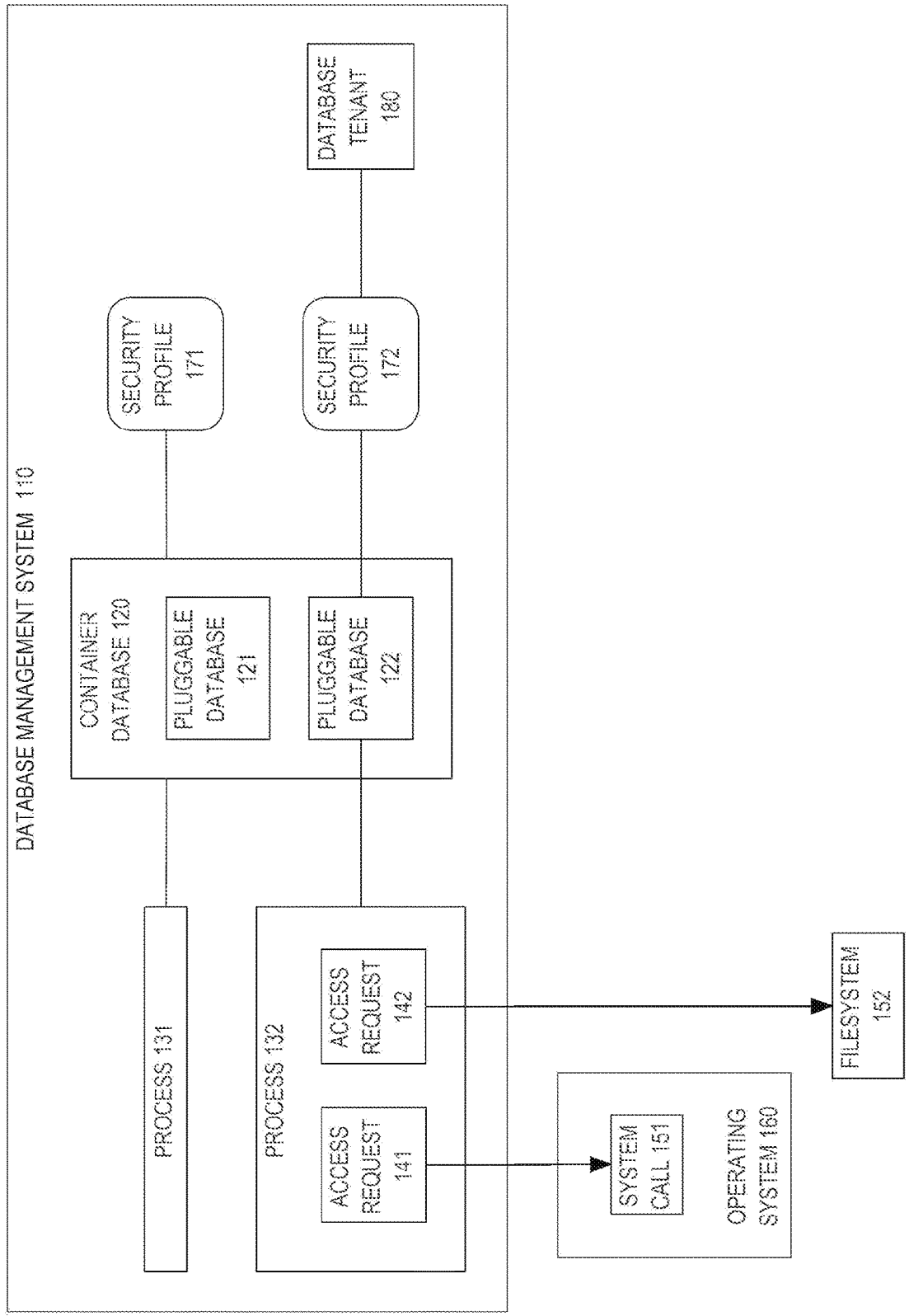
FIG. 1 is a block diagram that depicts an example computer that hosts a database management system (DBMS) that provides multitenant database security based on fine-grained and dynamic access control of protected resources according to phases and roles.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is an intelligent security model to access protected resources in a secure and phased manner for autonomous consolidated databases having multiple tenants. Secured access traverses a system and tenant hierarchy within a database system to provide dynamic level-based protection. In the multitenant environment and based on credentials of an accessing entity and runtime characteristics, the security model dynamically authorizes access in consultation with an intelligent global policy manager.

In certain cases, a deep hierarchy is needed that reflects database features such as application pluggable databases and consolidation of pluggable databases from a single client. Sometimes an execution entity such as a process or thread needs to elevate its role to access higher level resources. Database execution entities may need different security profiles based on their current role. A profile may consider protected resources of an operating system, related lower level resources, and the security model to access them such as by system calls or through capability based execution. For example, accessing the operating system from a pluggable database should use a restricted profile and limit filesystem navigation. In comparison, access from a higher level consolidated database execution entity may require broad access to the operating system for more privileged execution.

In an embodiment, an execution entity may enter an operational phase that should have decreased privileges such as for a leaf level tenant database. A controlled step wise restriction to access protected entities may be mandatory for autonomous cloud environments. Given the random characteristics of intruders and their persistent and evolving efforts of (e.g. structured query language injection) attack, static restriction at different phases may be insufficient. Considering different characteristics of databases, such as quality of service, access can be further restricted. As an example, a premium enterprise database and a free database need not have the same access to special features such as an enhanced-security filesystem that may need mount privileges. A requirement to mount a directory tree may need to be dynamically granted based on a runtime decision such as when free-tier is upgraded to a premium enterprise database. Various access to protected resources cannot be determined until access is attempted and dynamically validated against a global policy manager.

Herein is a security model to achieve those requirements through dynamic, hierarchical, multi-layered, phased, secure access profiles granted to database entities. These entities are continually monitored and managed for overall security of the autonomous databases in cloud environments. In an embodiment, centrally managed policy decisions for restricted access are dynamically employed across a fleet of databases through a global policy manager.

In an embodiment, a computer associates a process with a particular pluggable database of many pluggable databases in a container database in a database management system (DBMS). From the process, a request is received to access a protected resource that the particular pluggable database does not contain. Based on the protected resource and the particular pluggable database, the DBMS dynamically decides, in response to receiving the request, whether to permit access to the protected resource. Based on authorization by the DBMS, the protected resource is accessed to fulfil the request.

Dynamic authorization is a novel way to facilitate challenging database scenarios such as for lifecycles and duty cycles of database components that have shifting security needs. Example scenarios include privilege adjustment during component initialization or maintenance, quality of service upgrade or downgrade, and trusted scheduled operations such as elastic horizontal scaling and offline staging such as for reporting. Example shifting security patterns include phased operations, lifecycle transitions, and periodic and scheduled tasks. When security is partially delegated to the database tenant itself, according to techniques and mechanisms herein, tenant-proprietary dynamic authorization decisions may be based on custom and confidential heuristics to achieve database security patterns that are otherwise unsupported by the state of the art.

1.0 Example Container Database Management System

FIG. 1 is a block diagram that depicts example computer 100 that hosts database management system (DBMS) 110 that provides multitenant database security based on fine-grained and dynamic access control of protected resources according to phases and roles. Computer 100 may be one or more of a rack server such as a blade, a mainframe, a virtual machine, or other computing device.

DBMS 110 contains software for administering, using, and operating databases 120-122 for structured storage of bulk data in volatile or nonvolatile storage that computer 100 contains or accesses. For example, databases 120-122 may contain any of relational tables, hierarchical semi-structured documents such as JavaScript object notation (JSON) and extensible markup language (XML), resource description framework (RDF) triples, logical graphs, key/value pairs, stored procedures, user defined functions (UDFs), views, and data schemas.

1.1 Database Tenant

In an embodiment, computer 100 is part of a public cloud that has many tenants such as database tenant 180. Representing one or more users, a tenant is a client entity that may be or have one or more of a database user account, an operating system (OS) user account, or a cloud user account. For example, database tenant 180 may represent, or be owned or controlled by, a third party enterprise that is a customer of the public cloud.

Each tenant may own, control, or operate its own mutually exclusive set of databases. A pluggable database has at most one tenant. For example, database tenant 180 is the only tenant of pluggable database 122. A multitenant container database may contain multiple pluggable databases with different respective tenants. For example, pluggable databases 121-122 may have different respective tenants. In an embodiment, tenant 180 can administer pluggable database 122 but not databases 120-121 nor DBMS 110. Implementation and operation techniques for container databases and pluggable databases are presented later herein.

A tenant may have multiple pluggable databases in a same or different container databases. For example, pluggable databases 121-122 may have the same database tenant 180. In an embodiment, a container database may have its own tenant, such as when the tenant is common to some or all of the pluggable databases in the container database.

A database may be operated by a default (e.g. system) tenant that represents the operator of a cloud or the operator of DBMS 110, or the database may operate without a tenant. A tenant may have one or more database user accounts, each with one or more database sessions (e.g. connections) for a same or multiple databases. In an embodiment, some or all databases may by autonomously operated with a system tenant or without a tenant by DBMS 110.

1.2 Security Profile

Activity of database tenant 180 may generate access requests 141-142 in attempts to access protected resources such as system call 151 and filesystem 152. DBMS 110 may operate as or cooperate with a global policy manager to enforce access control for protected resources. If database tenant 180 lacks sufficient privilege, DBMS 110 may decline access request 141 and/or 142.

In an embodiment, a database or a database tenant may be associated with a declarative and configurable security profile that DBMS 110 may consult when deciding whether to permit or reject an access request. For example, DBMS 110 may analyze security profile 172 to decide whether or not to fulfil access requests 141-142 on behalf of database tenant 180 and pluggable database 122.

Security profiles may be hierarchical. For example, security profile 172 that is associated with pluggable database 122 should not have more privileges than security profile 171 that is associated with container database 120 that contains pluggable database 122. That is, the privileges of security profile 172 should be a subset of those of security profile 171, which DBMS 110 may verify in an embodiment.

For example, configuration of security profile 172 may be rejected if security profile 172 specifies a privilege that security profile 171 lacks. In an embodiment, DBMS 110 dynamically verifies that access request 141 satisfies both security profiles 171-172.

Processes 131-132 may each be an execution mechanism such as a thread or a heavy weight process. Herein, 'process' is used to generally refer to any execution context, regardless of how the execution context is implemented. In various embodiments, a process may be: a) a heavy weight process defined by OS 160 and having its own address space or an address space that is shared with related processes orb) a light weight thread that OS 160 does or does not schedule within a heavy weight process.

Security profiles may be dynamically updated. For example as explained later herein, while process 132 is associated with pluggable database 122, the privileges of process 132 may evolve such as in a sequence of phases. In an embodiment, DBMS 110 may dynamically update security profile 172 to add or remove privileges such as when process 132 transitions from one lifecycle phase to another.

For example, access request 141 may succeed in an early phase of process 132 but fail if repeated in a later phase of same process 132 for same pluggable database 122. In an embodiment, DBMS 110 may dynamically reassign a security profile. For example, DBMS 110 may use security profile 171 in an early phase of process 132 and then use security profile 172 in a later phase of same process 132 for pluggable database 122. In an embodiment and as described later herein, the secure computing (seccomp) system call of Linux is used to transition a process to a somewhat or extremely restricted security regime that authorizes limited or almost no resource privileges, which may be ideal for multitenant and cloud security.

2.0 Example Authorization Process

Figure 2:
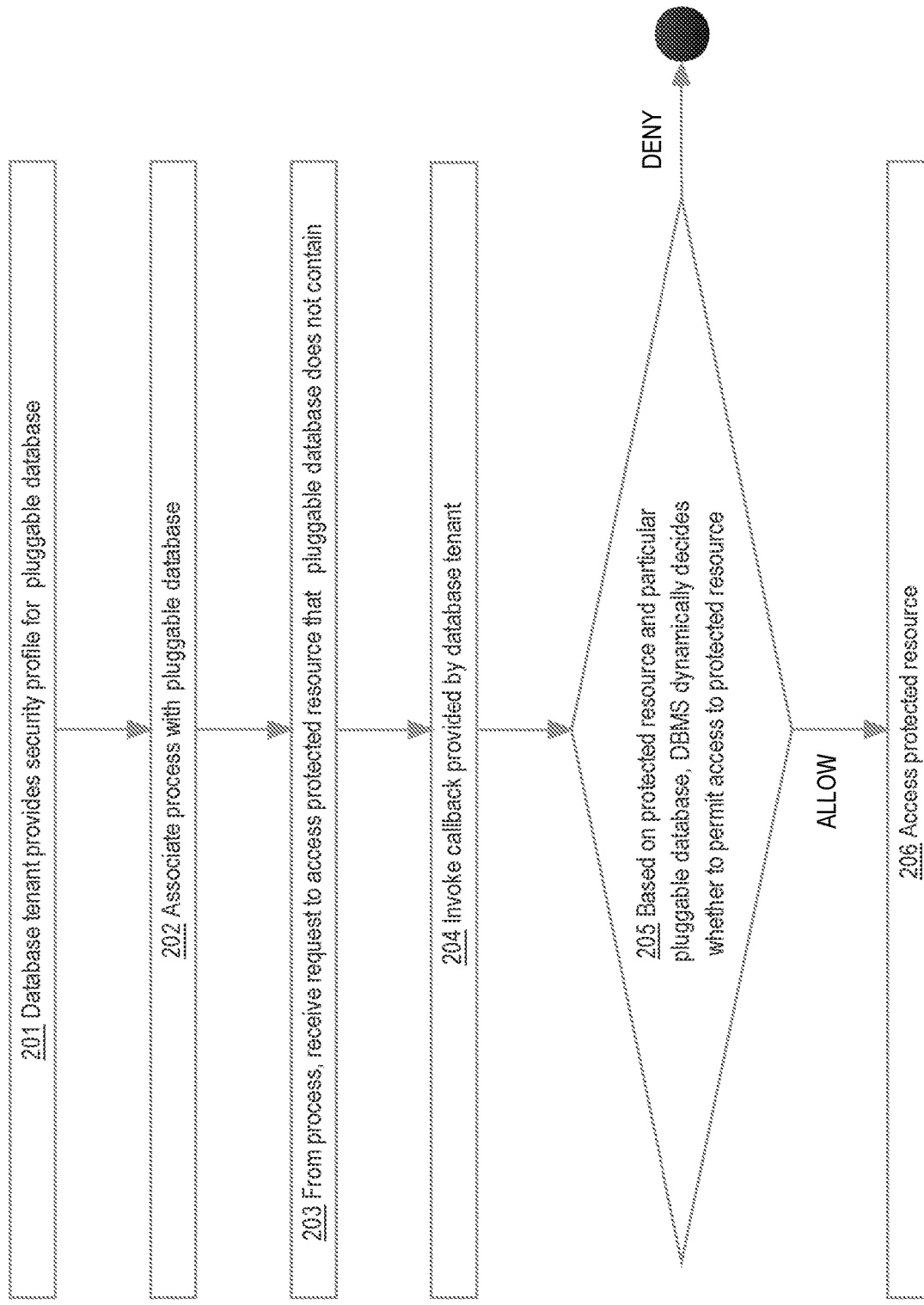
FIG. 2 is a flow diagram that depicts an example computer process that a DBMS performs to provide multitenant database security based on fine-grained and dynamic access control of protected resources according to phases and roles.

FIG. 2 is a flow diagram that depicts an example computer process that DBMS 110 performs to provide multitenant database security based on fine-grained and dynamic access control of protected resources according to phases and roles. FIG. 2 is discussed with reference to FIG. 1.

In preparatory step 201, database tenant 180 provides security profile 172 for pluggable database 122. For example, members of database tenant 180 may include a database administrator (DBA) who (e.g. manually) associates security profile 172 with pluggable database 122. Implementations of step 201 may use various mechanisms as follows.

Security profile 172 may be provided as a declaration such as an access control list in a text file that DBMS 110 parses into data structures within volatile memory of computer 100. For example, a DBA or a database script may issue a data control language (DCL) or data definition language (DDL) statement that references the text file and references pluggable database 122 or a user account associated with database tenant 180 such as a user account defined in pluggable database 122. Security profile 172 does not reference process 132 that might not yet exist as explained later herein.

In an embodiment, the declarative text file is bundled into a deliverable package that contains artifacts that define pluggable database 122 such as a database schema and scripts that DBMS 110 or operating system 160 can execute such as structured query language (SQL) scripts, shell scripts, or Python scripts. For example, security profile 172 may be a deployment descriptor for pluggable database 122 in an installable package such as a zip file, and step 201 may occur during creation of pluggable database 122 in container database 120.

In an embodiment, security profile 172 includes a security configuration that is native to operating system 160 that may be a variety of Unix such as Linux. For example, security profile 172 may contain Linux security declarations of various kinds for interpretation and enforcement by DBMS 110 or OS 160 as discussed later herein. A Linux namespace may be declared or referenced in security profile 172 to limit which protected resources are available to a Linux process or a set of related processes within DBMS 110.

For example, a namespace may declare which of protected resources 151-152 are accessible and in what ways by processes associated with pluggable database 122 or database tenant 180. Linux accepts namespaces for authorization to mount or unmount filesystem 152, designate a root directory, and change a current working directory of a process. A namespace can authorize spawning a new process such as by fork( ), terminating a process, grouping of multiple processes, and changing a hierarchy of parent and child processes.

A namespace can authorize inter-process communication (IPC) such as with shared memory, a data pipe, or a network connection with a socket. For example, a namespace may imply that system call 151 is or is not accessible with security profile 172.

A Linux control group (cgroup) may be declared or referenced in security profile 172 to impose resource usage quotas for protected resources that are available to a Linux process or a set of related processes such as processor time slices, volatile and nonvolatile storage, and network bandwidth. Resource access can be denied by setting a quota to zero for a cgroup.

Step 202 and/or 203 may be caused by: a) processing of a database command for pluggable database 122 such as a data manipulation language (DML), data definition language (DDL), or data control language (DCL) statement or b) autonomously by DBMS 110 such as during administration or use of other databases 120-121 or in response to an autonomous precondition or threshold such as for a fluctuating measurement of performance or resource consumption. For example, consumption of additional space for databases 120-121 may cause DBMS 110 to autonomously decide to reclaim storage space by compacting pluggable database 122.

Step 202 associates process 132 with pluggable database 122. For example, DBMS 110 may reallocate process 132 to pluggable database 122 from a pool of idle processes or may generate process 132 for pluggable database 122. In step 202, DBMS 110 may maintain a mapping such as a lookup table of process identifiers (pids) to databases or database tenants or security profiles so that DBMS 110 may detect which process operates on behalf of which database or database tenant and what privileges does each process have.

From process 132 in step 203, DBMS 110 receives access request 141 or 142 to access protected resource 151 or 152 that pluggable database 122 does not contain. In various examples, step 203 may occur while process 132: a) executes a SQL statement for pluggable database 122 or b) (e.g. autonomously) executes trusted logic that is part of DBMS 110. Alternatively, pluggable database 122 may be a polyglot database that contains a stored procedure or user defined function (UDF) that is implemented as scripting language statements such as Python or JavaScript that process 132 may call during step 203.

Techniques herein are based on interception of access requests 141-142 for authorization, which entails steps 204-205 in an embodiment. For example, DBMS 110 may directly receive and intercept access request 141 from process 132. In an embodiment, OS 160 instead receives and intercepts access request 141 from process 132, which causes OS 160 to invoke a callback routine that is part of DBMS 110. In either embodiment, control flow of process 132 may be transferred to logic in DBMS 110, either by synchronous linkage so that process 132 executes that logic in DBMS 110, or by task switching between process 132 and another process of DBMS 110.

In an embodiment of step 204, DBMS 110 receives that control flow and invokes a callback provided by database tenant 180 so that an authorization decision is delegated by DBMS 110 to the tenant callback. For example, database tenant 180 may desire stricter or finer-grained access control than DBMS 110 ordinarily provides by default. In one example, database tenant 180 has proprietary or confidential logic or criteria for access control in the tenant callback that the public cloud provider is expected to execute but not necessarily understand.

In an embodiment, the tenant callback is defined or declared in security profile 172. A same or different tenant callback routines may be provided for respective access requests 141-142, such as based on resource type or resource identity. Any callback herein for access request 141 may receive arguments such as the identities of: system call 151, process 132, databases 120 and 122, computer 100, security profile 172, and database tenant 180.

A tenant callback may be implemented as a stored procedure or UDF in database 120 or 122 or as an executable script or compiled logic in a code library that DBMS 110 links. The public cloud provider may provide an implementation of the tenant callback that the tenant may customize, or the tenant may provide a proprietary implementation of the tenant callback.

In an embodiment, DBMS 110 specifies its own callback or a tenant callback as an argument to the secure computing (seccomp) Linux system call for OS 160 to invoke to authorize a resource access attempt. Due to potentially perilous nature of unhardened authorization callback logic, seccomp( ) interprets instructions executed by the callback in a special virtual machine. A callback itself may be executed with security that is stricter than the security imposed on the process for which the callback is invoked. For example, a callback may successfully authorize process 132 to fulfil access request 142, even if seccomp( ) would deny the callback itself from attempting access request 142.

Based on a protected resource and pluggable database 122, DBMS 110 dynamically decides whether to permit access to the protected resource in decision step 205. In various embodiments, DBMS 110 does or does not cooperate with OS 160 for resource authorization. An embodiment may implement some or all of the following security design choices.

DBMS 110 operates in user mode of OS 160.
DBMS 110 is hosted in a user space of virtual memory.
DBMS 110 is not part of the kernel of OS 160.
DBMS 110 does not delegate authorization to OS 160.

In an embodiment in step 205, DBMS 110 records in volatile memory an indication of whether or not the current access request succeeds or fails authorization. Authorization of a future similar access request for a same resource for a same pluggable database by a same database tenant or with a same security profile may be accelerated by step 205 by consulting a retained indication of authorization or denial of a similar past access request instead of rigorously reauthorizing the future similar access request.

In various embodiments, DBMS 110 does or does not cooperate with OS 160 and/or database tenant 180 in a processing chain for authorization. For example, OS 160, DBMS 110, and the tenant callback may be authorization filters that operate in various orderings in a chain such that a next filter in the chain is invoked only if authorization by a previous filter succeeded. For example, regardless of whether OS 160 is a first filter or a last filter in the chain, an authorization denial by OS 160 for access request 141 cannot be overruled by DBMS 110 or database tenant 180.

If OS 160 is first in the chain, then denial by OS 160 means that the remainder of the chain need not execute. In an embodiment, the tenant callback is first in the chain; DBMS 110 is in the middle of the chain; and OS 160 is last in the chain. In that case, access request 141 is permitted only if all three filters in the chain agree that authorization should succeed.

For example in step 204, the client callback may indicate successful authorization, which DBMS 110 may overrule in decision step 205. Such denial of access request 141 is shown as a black circle that indicates that access request 141 is denied and that there need be no further processing of forbidden access request 141. In an embodiment, denial of access request 141 is logged or alerted as an intentional or accidental attempt to access a protected resource such as system call 151.

In a different scenario, access request 141 is not denied. In that case, the protected resource such as system call 151 is accessed by process 132 in step 206. After step 206 for access request 141, process 132 may make additional access requests for pluggable database 122 and database tenant 180, such as access request 142.

Eventually, processing for pluggable database 122 and database tenant 180 may finish, and process 132 may terminate or be taken out of service and returned to a pool of idle processes in DBMS 110. Process 132 may be taken from the idle pool, placed back into service, and be assigned for processing of pluggable database 121 that may have a different security profile, a different database tenant, and a different tenant callback. For example, although process 132 succeeded at accessing system call 151 for pluggable database 122 in step 206, a similar access request for the same protected resource by same process 132 might instead be denied after process 132 is reassigned for pluggable database 121.

Process 132 may be eventually be reassigned for container database 120 that has security profile 171 that may permit access to some protected resources that security profile 172 forbids for pluggable database 122. For example, access request 142 for filesystem 152 may be denied when process 132 is assigned for pluggable database 122, but a similar access request for same filesystem 152 by same process 132 may succeed when process 132 is instead assigned for container database 120.

3.0 Example Phased Security Process

Figure 3:
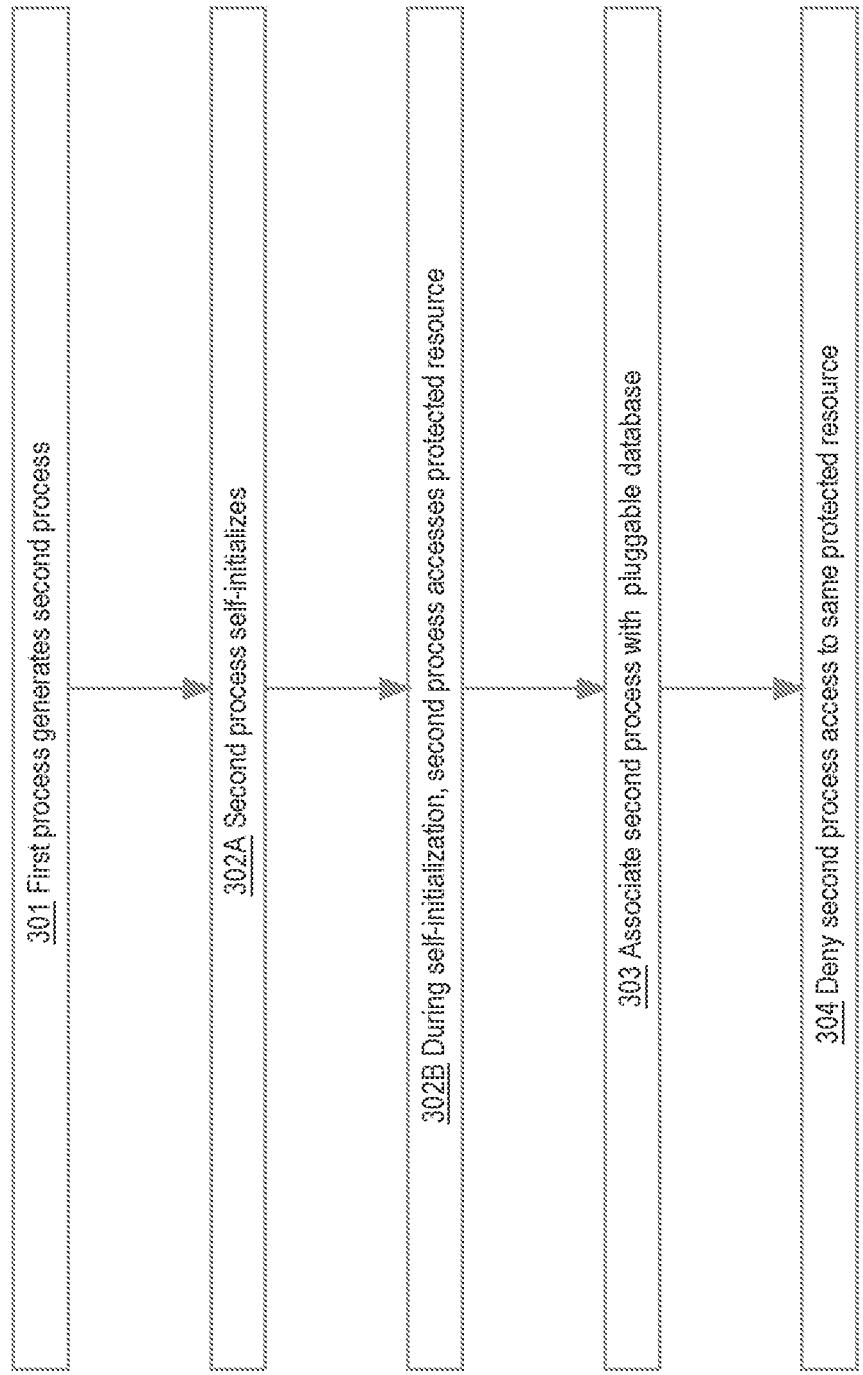
FIG. 3 is a flow diagram that depicts an example computer process that a DBMS performs to provide phased security.

FIG. 3 is a flow diagram that depicts an example computer process that DBMS 110 may perform to provide phased security. FIG. 3 is discussed with reference to FIG. 1.

DBMS 110 may contain many processes such as processes 131-132 that may or may not be associated with a pluggable database. In this example scenario, database tenant 180 has client software that sends DBMS 110 a database command to execute for pluggable database 122. However at that time, pluggable database 122 does not yet have a process that can execute the command.

Process 131 may be associated with container database 120 and may receive a connection attempt from database tenant 180 to create a database session for pluggable database 122. For example, process 131 may listen for the connection attempt on a network socket and react to the connection attempt by spawning a new process that will implement the database session. In step 301, process 131 generates process 132, which is permitted by security profile 171 for process 131 that is associated with container database 120.

After step 301, process 131 may resume listening for connection attempts on the network socket. Initially, process 132 also is associated with container database 120 and security profile 171. In step 302A, process 132 self-initializes in preparation for implementing the database session. DBMS 110 imposes phased security on process 132 such that process 132 has more privileges during self-initialization and less privileges when the database session becomes fully established for pluggable database 122. Thus, access of some resources by process 132 may succeed during self-initialization in step 302B but later, when process 132 becomes associated with pluggable database 122 in step 303, may fail if attempted by the database session in step 304.

4.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML, is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

5.0 Pluggable Database and Container Database System Overview

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database objects included in each PDB. Further, each pluggable database includes a PDB-specific database dictionary that comprises metadata that defines database objects contained in the pluggable database. Database objects include tables, table columns, indexes, files, tablespaces, data types, users, user privileges, and storage structures used for storing database object data, etc.

A container database may manage multiple pluggable databases and a given database server instance may manage and serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A given container database is configured based on the requirements of those database management system (DBMS) features that are applicable to the container database. A DBMS feature that is applicable to a container database is one that interacts with or influences the container database and, as such, requires a certain configuration of the container database. DBMS features that may be applicable to a given container database, comprise one or more of: a version of the DBMS that manages the container database (including major version, minor version, and/or patch level); optional features that may be installed or implemented for a container database (such as data encryption, a feature that allows multiple levels of data restriction within areas of the database, localization enablement); common users that exist in the container database; independently-installed patches that have been installed for the DBMS that manages the container database; etc.

The configuration of a CDB encompasses aspects of the CDB that are adjusted based on the DBMS features that are applicable to the CDB. Such aspects of the CDB comprise one or more of: data stored within or the structure of the database objects stored in the pluggable databases of the CDB; the layout or content of the underlying operating system files of the CDB; the number of background processes required by the CDB; identifiers associated with the CDB; variables required for CDB functionality; initialization parameters; a character set with which data in the CDB is encoded; time zones supported by the CDB; standard database block size; tablespace settings; undo settings; services supported by the CDB; special features implemented for the CDB; database server instance cluster support for the CDB; etc.

Pluggable databases may be "plugged in" to a container database, and may be transported between database servers and/or database management systems. A database server instance plugs a pluggable database into a container database by including metadata describing the pluggable database in the database dictionary of the container database and by initiating management of the pluggable database as part of the container database. Any number of the aspects of the configuration of a container database, into which a particular pluggable database is plugged, affects the pluggable database.

When a pluggable database is moved to a destination container database from a source container database, where the destination and source container databases have the same configuration, the pluggable database need not be reconfigured prior to making the pluggable database available to operations at the destination container database. However, the source and destination container databases of a relocating pluggable database are not always configured for the same set of DBMS features. When a pluggable database is moved to a destination container database that has a different configuration than the source container database of the pluggable database, the relocated pluggable database is reconfigured to conform to the configuration of the destination container database, which allows the relocated pluggable database to be compatible with the DBMS features that are applicable to the destination container database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
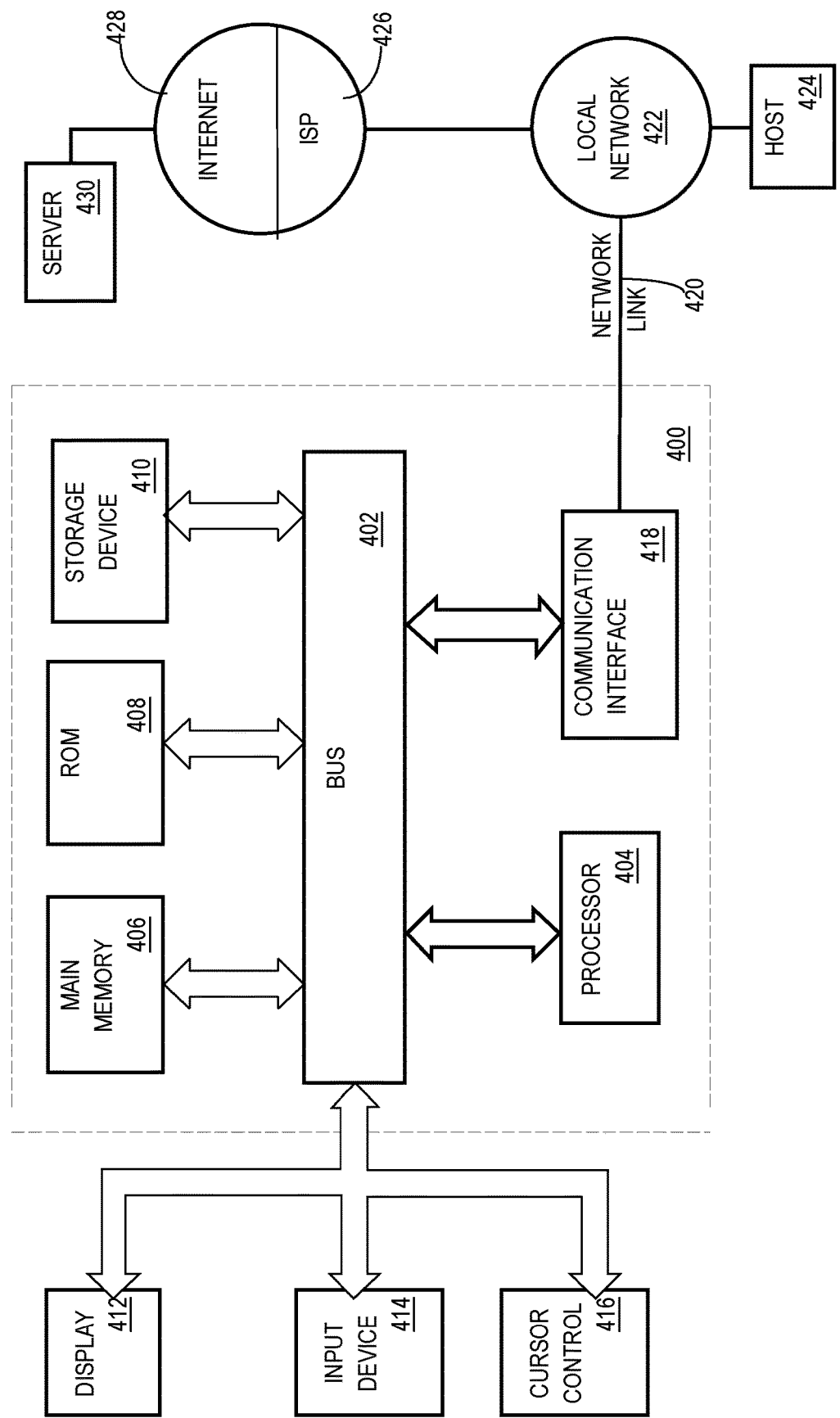
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a compact disc ROM (CD-ROM), any other optical data storage medium, any physical medium with patterns of holes, a RAM, a programmable ROM (PROM), an erasable PROM (EPROM), a FLASH-EPROM, nonvolatile RAM (NVRAM), any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
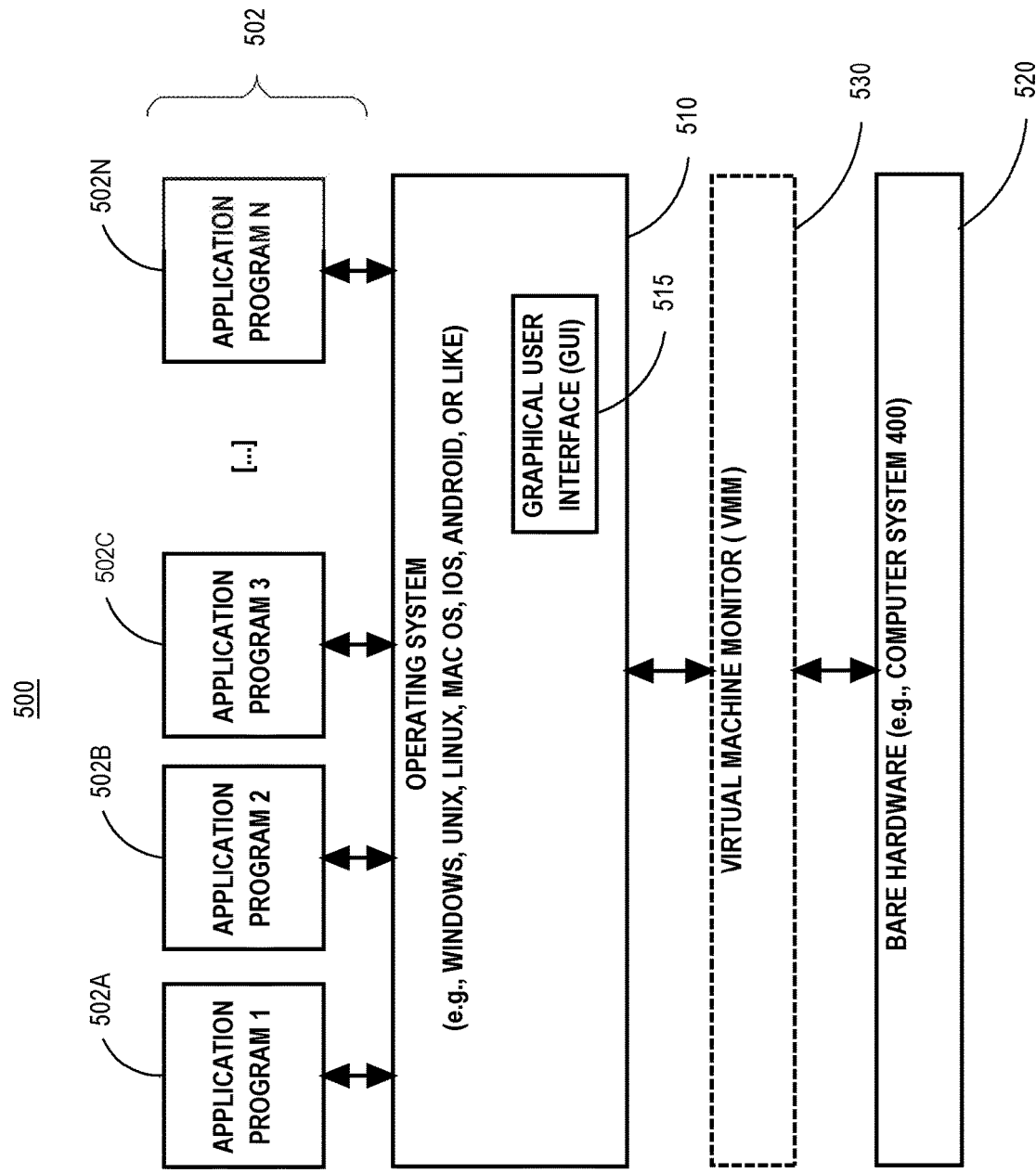
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 46, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 46 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   associating a process with a particular pluggable database of a plurality of pluggable databases in a container database in a database management system (DBMS);
   receiving, from the process, a request to access a protected resource that the particular pluggable database does not contain;
   dynamically deciding by the DBMS in response to said receiving the request, based on the protected resource and the particular pluggable database, whether to permit said access to the protected resource; and
   accessing, based on said dynamically deciding whether to permit said access, the protected resource.

2. The method of claim 1 further comprising:
   second associating, after said accessing the protected resource, said process with a different pluggable database of the plurality of pluggable databases that does not contain the protected resource; and
   denying, after said second associating with the different pluggable database, the process access to the protected resource.

3. The method of claim 1 wherein:
   said process is a first process;
   the method further comprises:
   performing before said associating said first process with the particular pluggable database:
   a) generating said first process by a second process that is not associated with a pluggable database, wherein said first process initially is not associated with a pluggable database;
   b) self-initializing by said first process; and
   c) accessing, by said first process during said self-initializing, a second protected resource; and
   denying, after said associating said first process with the particular pluggable database, said first process access to said second protected resource.

4. The method of claim 1 wherein said associating said process with the particular pluggable database comprises removing the process from a pool of idle processes.

5. The method of claim 1 further comprising:
   denying the process access to a second protected resource;
   second associating, after said denying the process access to the second protected resource, said process with the container database; and
   the process accessing, after said second associating with the container database, said second protected resource.

6. The method of claim 1 wherein at least one selected from a group consisting of:
   the DBMS operates in user mode of an operating system (OS),
   the DBMS resides in a user space of virtual memory,
   the DBMS is not part of a kernel of an OS, and
   said dynamically deciding by the DBMS whether to permit said access does not entail invoking logic of an OS.

7. The method of claim 1 wherein said receiving the request to access comprises at least one selected from a group consisting of:
   interception, by the DBMS, of an attempted system call into an operating system (OS),
   invocation, by an OS, of a callback in the DBMS,
   detection, by the DBMS, of an attempt to mount a filesystem, and
   detection, by the DBMS, of an attempt to spawn an OS process.

8. The method of claim 1 wherein:
   the particular pluggable database is associated with a database tenant;
   the method further comprises providing, by the database tenant, a security profile for the particular pluggable database; and
   said dynamically deciding by the DBMS whether to permit said access is based on the security profile for the particular pluggable database.

9. The method of claim 8 wherein the database tenant cannot administer at least one selected from a group consisting of the container database and the DBMS.

10. The method of claim 8 wherein said dynamically deciding by the DBMS whether to permit said access comprises invoking a callback provided by the database tenant.

11. The method of claim 1 wherein said dynamically deciding by the DBMS whether to permit said access comprises inspecting an indication that access to the protected resource was permitted for a previous request to access the protected resource.

12. The method of claim 1 wherein:
   the method further comprises associating the container database with a first security profile and the particular pluggable database with a second security profile that is less privileged than the first security profile; and
   said dynamically deciding by the DBMS whether to permit said access is based on the second security profile.

13. One or more non-transitory computer-readable media storing instructions that, when executed by one or more processors, cause:
   associating a process with a particular pluggable database of a plurality of pluggable databases in a container database in a database management system (DBMS);
   receiving, from the process, a request to access a protected resource that the particular pluggable database does not contain;
   dynamically deciding by the DBMS in response to said receiving the request, based on the protected resource and the particular pluggable database, whether to permit said access to the protected resource; and accessing, based on said dynamically deciding whether to permit said access, the protected resource.

14. The one or more non-transitory computer-readable media of claim 13 wherein the instructions further cause:
second associating, after said accessing the protected resource, said process with a different pluggable database of the plurality of pluggable databases that does not contain the protected resource; and
denying, after said second associating with the different pluggable database, the process access to the protected resource.

15. The one or more non-transitory computer-readable media of claim 13 wherein:
said process is a first process;
the instructions further cause:
performing before said associating said first process with the particular pluggable database:
a) generating said first process by a second process that is not associated with a pluggable database, wherein said first process initially is not associated with a pluggable database;
b) self-initializing by said first process; and
c) accessing, by said first process during said self-initializing, a second protected resource; and
denying, after said associating said first process with the particular pluggable database, said first process access to said second protected resource.

16. The one or more non-transitory computer-readable media of claim 13 wherein the instructions further cause:
denying the process access to a second protected resource;
second associating, after said denying the process access to the second protected resource, said process with the container database; and
the process accessing, after said second associating with the container database, said second protected resource.

17. The one or more non-transitory computer-readable media of claim 13 wherein at least one selected from a group consisting of:

the DBMS operates in user mode of an operating system (OS),
the DBMS resides in a user space of virtual memory,
the DBMS is not part of a kernel of an OS, and
said dynamically deciding by the DBMS whether to permit said access does not tail invoking logic of an OS.

18. The one or more non-transitory computer-readable media of claim 13 wherein said receiving the request to access comprises at least one selected from a group consisting of:
interception, by the DBMS, of an attempted system call into an operating system (OS),
invocation, by an OS, of a callback in the DBMS,
detection, by the DBMS, of an attempt to mount a filesystem, and
detection, by the DBMS, of an attempt to spawn an OS process.

19. The one or more non-transitory computer-readable media of claim 13 wherein:
the particular pluggable database is associated with a database tenant;
the instructions further cause providing, by the database tenant, a security profile for the particular pluggable database; and
said dynamically deciding by the DBMS whether to permit said access is based on the security profile for the particular pluggable database.

20. The one or more non-transitory computer-readable media of claim 13 wherein said dynamically deciding by the DBMS whether to permit said access comprises inspecting an indication that access to the protected resource was permitted for a previous request to access the protected resource.

* * * * *

UNITED STATES PATENT AND TRADEMARK OFFICE
CERTIFICATE OF CORRECTION

PATENT NO. : 12,050,708 B2  
APPLICATION NO. : 17/692709  
DATED : July 30, 2024  
INVENTOR(S) : Lakkundi et al.

Page 1 of 1

It is certified that error appears in the above-identified patent and that said Letters Patent is hereby corrected as shown below:

On the Title Page

Column 1, under Inventors, Line 1, delete "Telengana" and insert -- Telangana --, therefor.

In the Specification

In Column 5, Line 42, delete "by" and insert -- be --, therefor.

In Column 10, Line 53, delete "XML," and insert -- XML --, therefor.

In the Claims

In Column 20, Line 6, in Claim 17, delete "tail" and insert -- entail --, therefor.

Signed and Sealed this  
Tenth Day of December, 2024

Katherine Kelly Vidal  
*Director of the United States Patent and Trademark Office*